(12) United States Patent
Hsu

(10) Patent No.: US 6,223,795 B1
(45) Date of Patent: May 1, 2001

(54) VEHICLE INNER TUBE WITH MEANS FOR PROTECTION AGAINST PIERCING OF POINTED OBJECTS

(76) Inventor: Shut-Chen Hsu, No. 7 Alley 1, Lane 163, Sec. 3, Nun-Chuan Rd., I, Lan (TW)

( * ) Notice: Subject to any disclaimer, the term of this patent is extended or adjusted under 35 U.S.C. 154(b) by 0 days.

(21) Appl. No.: 09/342,253

(22) Filed: Jun. 29, 1999

Related U.S. Application Data

(63) Continuation-in-part of application No. 09/193,232, filed on Nov. 17, 1998, now Pat. No. 6,047,753.

(51) Int. Cl.[7] ........................................................ B60C 5/08
(52) U.S. Cl. .......................... 152/157; 152/165; 152/317; 152/320; 152/512
(58) Field of Search ..................... 152/512, 157, 152/158, 159, 165, 166, 310–322

(56) References Cited

U.S. PATENT DOCUMENTS

| | | | |
|---|---|---|---|
| 1,061,204 | * | 5/1913 | Smith et al. .......................... 152/157 |
| 1,444,892 | * | 2/1923 | Westgate et al. ..................... 152/316 |
| 1,499,793 | * | 7/1924 | Taylor .................................. 152/321 |
| 1,808,404 | * | 6/1931 | Freerksen ............................ 152/321 |
| 3,256,123 | * | 6/1966 | Hart .................................... 152/317 |
| 5,031,679 | * | 7/1991 | Shoner ................................ 152/157 |

* cited by examiner

Primary Examiner—Gregory L. Knable
(74) Attorney, Agent, or Firm—Rosenberg, Klein & Lee

(57) ABSTRACT

A vehicle inner tube, which includes an inflatable tube formed of a plurality of air balls, the inflatable tube having an air chamber defined on the inside, two sets of curved grooves spirally arranged at two opposite side walls thereof around an air chamber, and a plurality of insertion slots spirally arranged around the curved grooves through the two opposite side walls, and a plurality of breaker members and side bumper members respectively mounted in the insertion slots and curved grooves at the inflatable tube, the breaker members and side bumper members each including a flexible base pad formed of a big number of air balls, and a breaker adhered to the base pad at one side.

3 Claims, 9 Drawing Sheets

VEHICLE INNER TUBE WITH MEANS FOR PROTECTION AGAINST PIERCING OF POINTED OBJECTS

CROSS-REFERENCE OF RELATED APPLICATION

The present invention is a continuation-in-part of U.S. patent application Ser. No. 09/193,232 filed Nov. 17, 1998, now U.S. Pat. No. 6,047,753.

BACKGROUND OF THE INVENTION

Regular motorcycle and automobile tires do not have an inner tube. When a pointed object pierced the tire of a motor vehicle, air does not immediately leak out. However, if the motor vehicle keeps running for a certain length of time after piercing of a pointed object through one tire thereof, the tire may explode, causing a catastrophe. In order to eliminate this problem, "high-speed" tires are developed. A "high-speed" tire is made of elastic material of high density. When pierced by a pointed object, the tire does not leak immediately, and the car driver has sufficient time to repair the tire. However, because this structure of tire does not leak immediately when pierced by a pointed object, the car driver may not find the problem before an accident occurs. U.S. patent application Ser. No. 09/193,232, entitled "Vehicle inner tube with protective breaker means", teaches a measure to eliminate the aforesaid problem. The vehicle inner tube according to U.S. patent application Ser. No. 09/193,232 is functional, however its structure is complicated, and its manufacturing cost is high.

SUMMARY OF THE INVENTION

The present invention has been accomplished under the circumstances in view. According to one embodiment of the present invention, the vehicle inner tube comprises an inflatable tube formed of a plurality of air balls, the inflatable tube having an air chamber defined on the inside, two sets of curved grooves spirally arranged at two opposite side walls thereof around an air chamber, and a plurality of insertion slots spirally arranged around the curved grooves through the two opposite side walls, and a plurality of breaker members and side bumper members respectively mounted in the insertion slots and curved grooves at the inflatable tube, the breaker members and side bumper members each including a flexible base pad formed of a big number of air balls, and a breaker adhered to the base pad at one side. In an alternate form of the present invention, the curved grooves and the side bumper members are eliminated. In another alternate form of the present invention, the insertion slots and the breaker members are eliminated.

DETAILED DESCRIPTION OF THE PREFERRED EMBODIMENT

Figure 1:
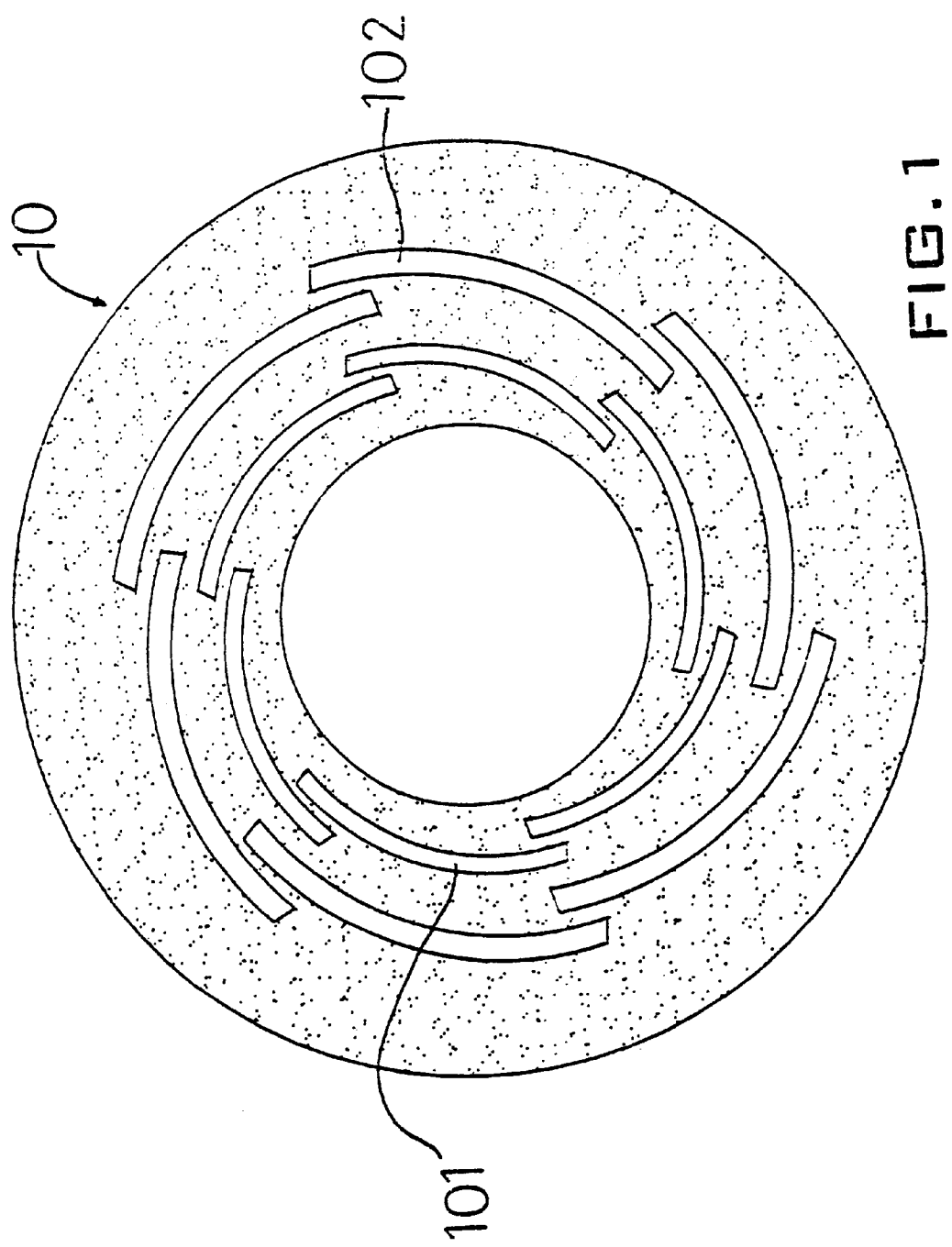
FIG. 1 is a side view of an inflatable tube for a vehicle inner tube according to the present invention.
Figure 2:
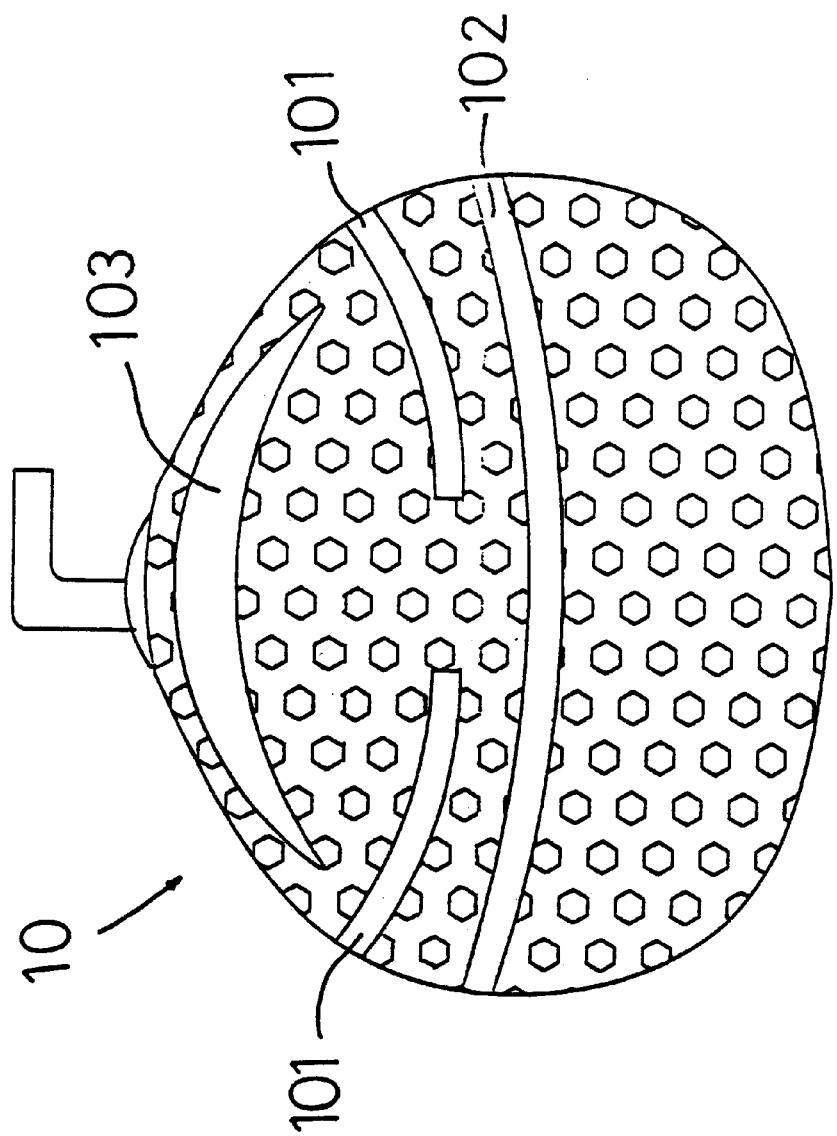
FIG. 2 is a cross sectional view of the inflatable tube shown in FIG. 1.

Referring to FIGS. 1 and 2, a vehicle inner tube is shown comprised of an inflatable tube 10 formed of a big number of air balls, having an air chamber 103 defined on the inside, two sets of curved grooves 101 spirally arranged at its two opposite side walls around its axial center, and a plurality of insertion slots 102 spirally arranged around the curved grooves 101 through its two opposite side walls.

Figure 3:
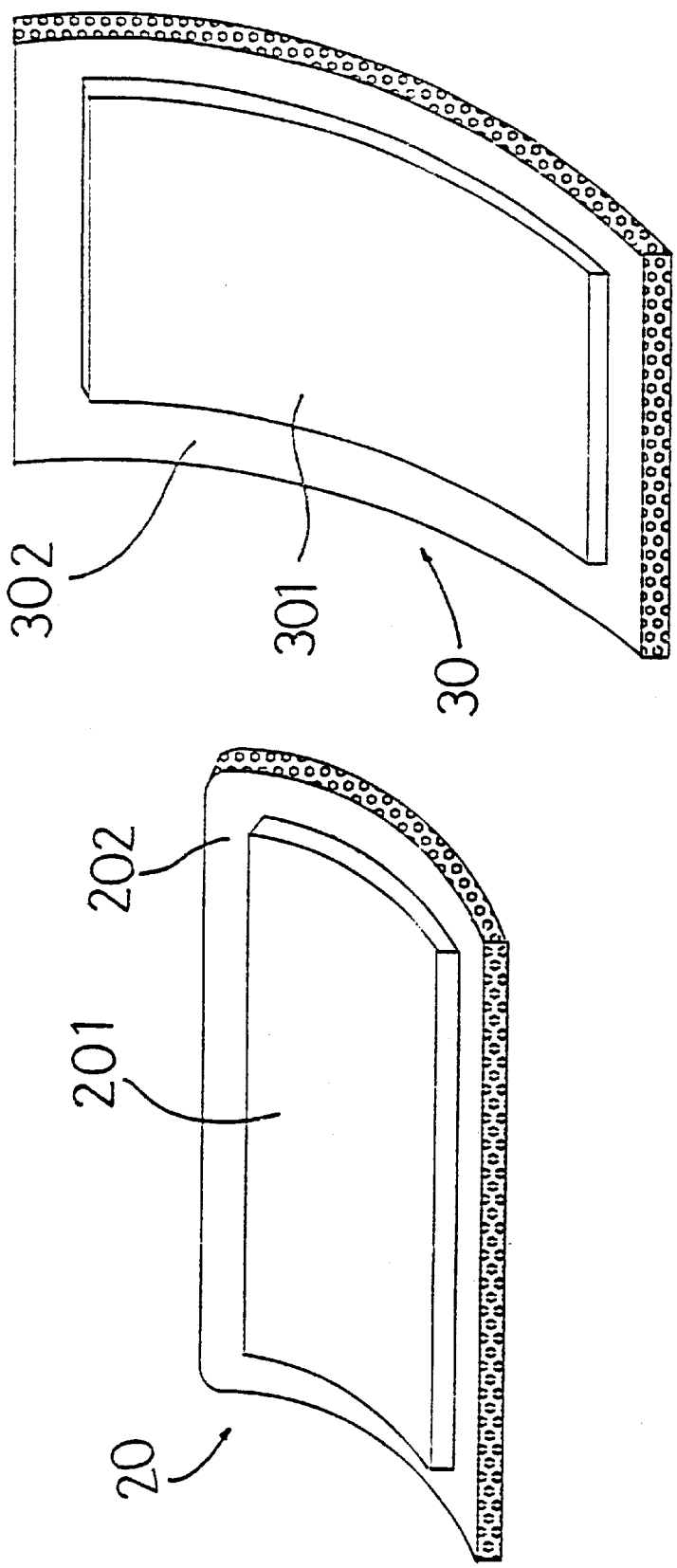
FIG. 3 illustrates a breaker member and a side bumper member for a vehicle inner tube according to the present invention.
Figure 4:
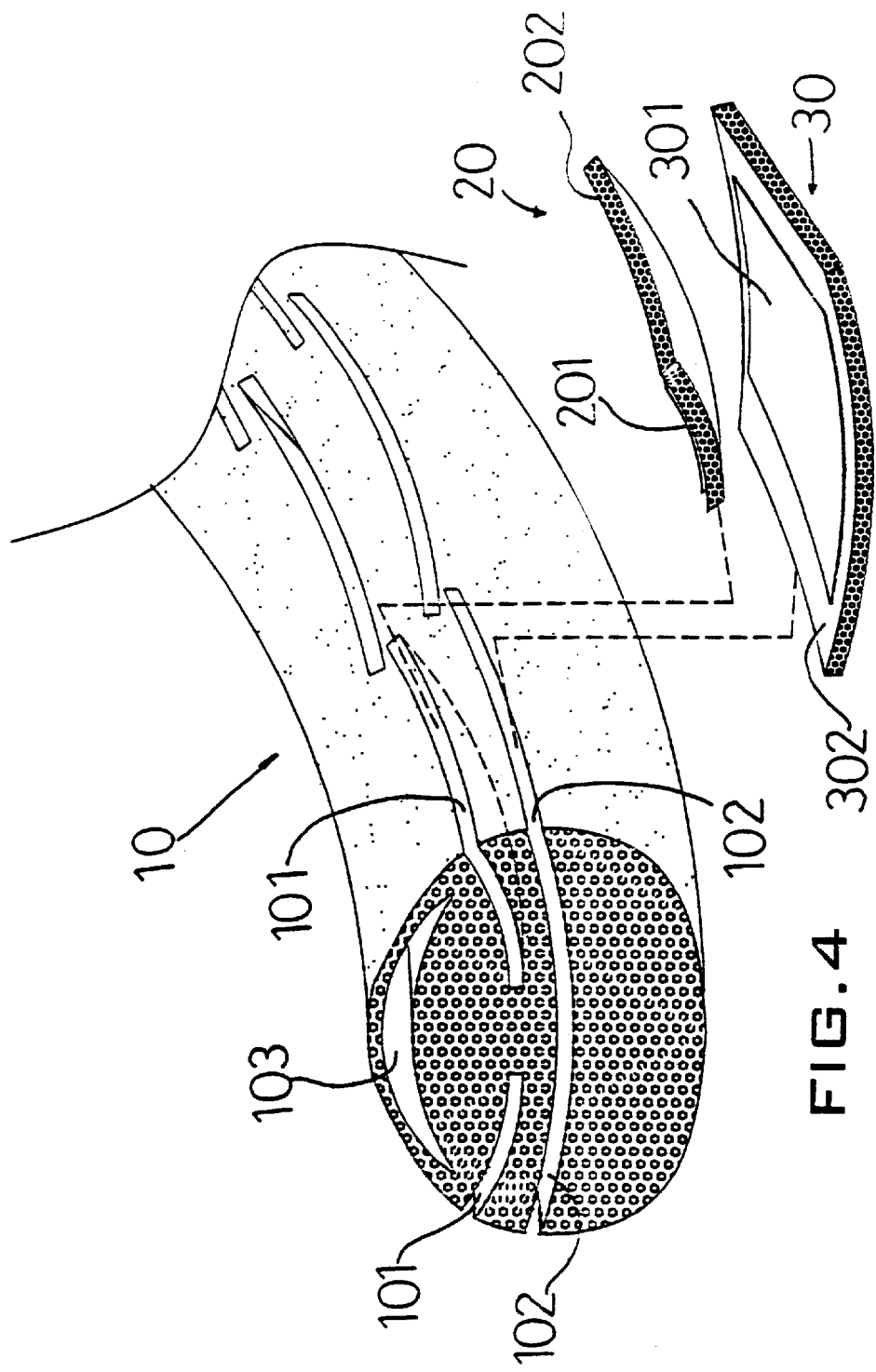
FIG. 4 is a schematic drawing showing the installation of breaker members and side bumper members in the insertion slots and curved grooves at the inflatable tube according to the present invention.

FIG. 3 illustrates a breaker member 30 and a side bumper member 20 constructed according to the present invention. The breaker member 30 and the side bumper member 20 each are comprised of a flexible base pad 202 or 302 formed of a big number of air balls, and a breaker 201 or 301 adhered to the base pad 202 or 302 at one side.

Figure 5:
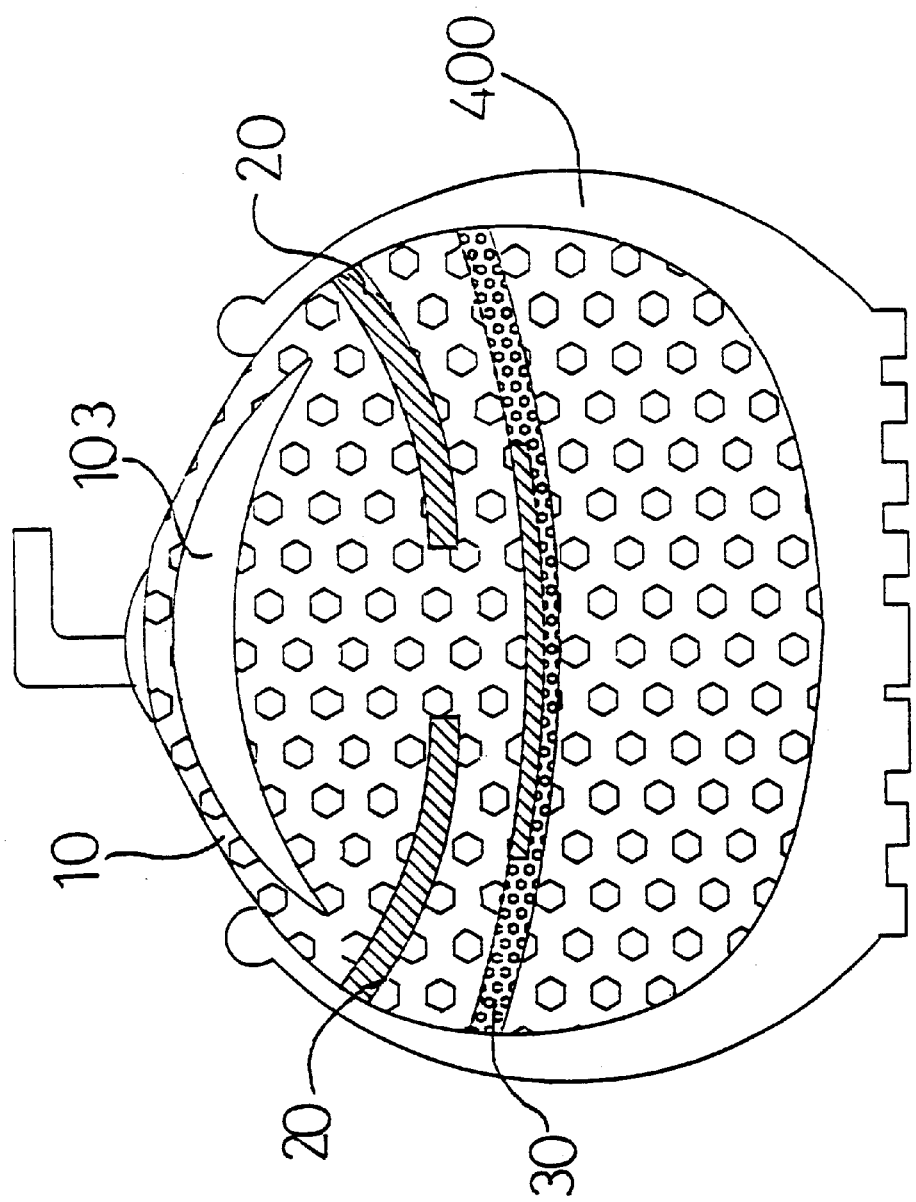
FIG. 5 is a sectional view showing the vehicle inner tube mounted within an outer tire according to the present invention.
Figure 6:
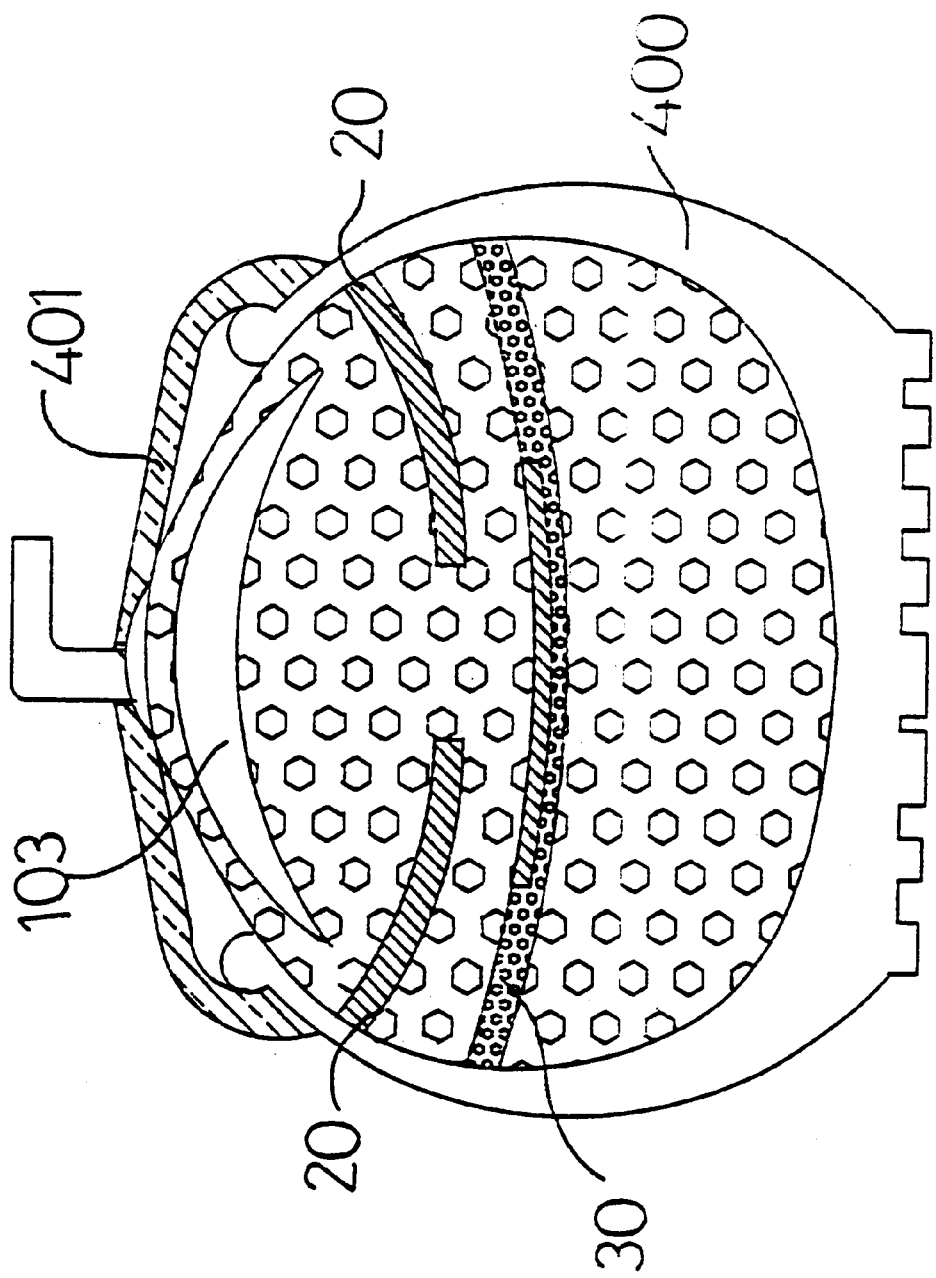
FIG. 6 is a sectional view showing the vehicle inner tube mounted within an outer tire and fastened to a metal wheel frame according to the present invention.
Figure 7:
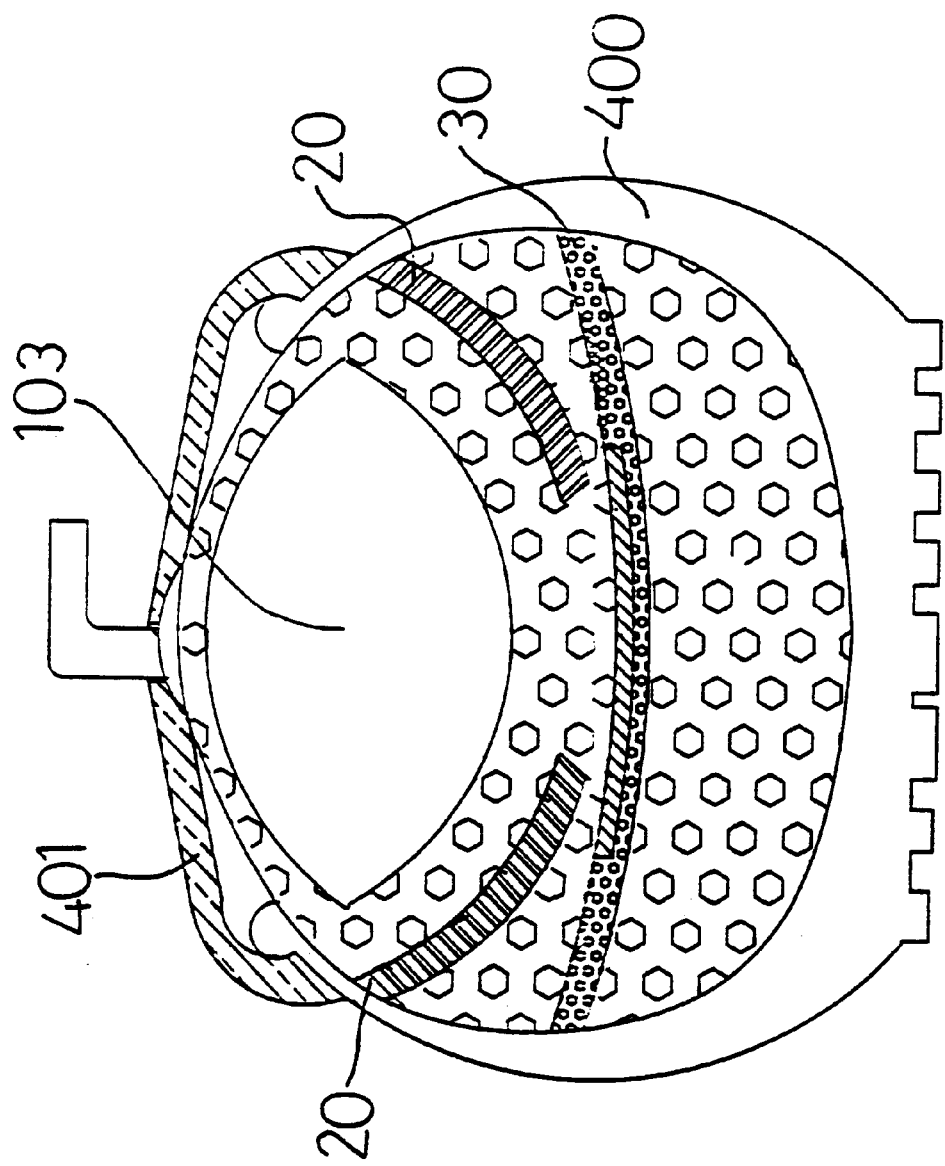
FIG. 7 is similar to FIG. 6 but showing the vehicle inner tube inflated.

Referring to Figures from 4 through 7, breaker members 30 and side bumper members 20 are respectively inserted into the insertion slots 102 and grooves 101 at the inflatable tube 10 to protect the air chamber 103 against piercing of pointed objects. After installation of the breaker members 30 and the side bumper members 20 in the inflatable tube 10, the inflatable tube 10 is mounted in an outer tire 400 (see FIG. 5), and then a metal wheel frame 401 is fastened to the outer tire 400 and the inflatable tube 10 (see FIG. 6). When installed, compressed air is pumped into the air chamber 103 to inflate the inflatable tube 10 (see FIG. 7). When inflated, the breaker members 30 and side bumper members 20 are stretched outwards, causing the distance between the breaker members 30 and the side bumper members 20 to be relatively reduced, therefore, the air chamber 103 is well protected by the breaker members 30 and the side bumper members 20 against piercing of pointed objects. Because the inflatable tube 10 is formed of a big number of air balls joined together with an air chamber defined in it, its has a certain wall thickness and strong spring power. If a pointed object is pierced through the outer tire 400 into the inflatable tube 10, the air chamber 103 and the metal wheel frame 401 are well protected by the breaker members 30 and the side bumper members 20 against the pointed object, therefore the air chamber 103 can be maintained in an air tight condition.

Figure 8:
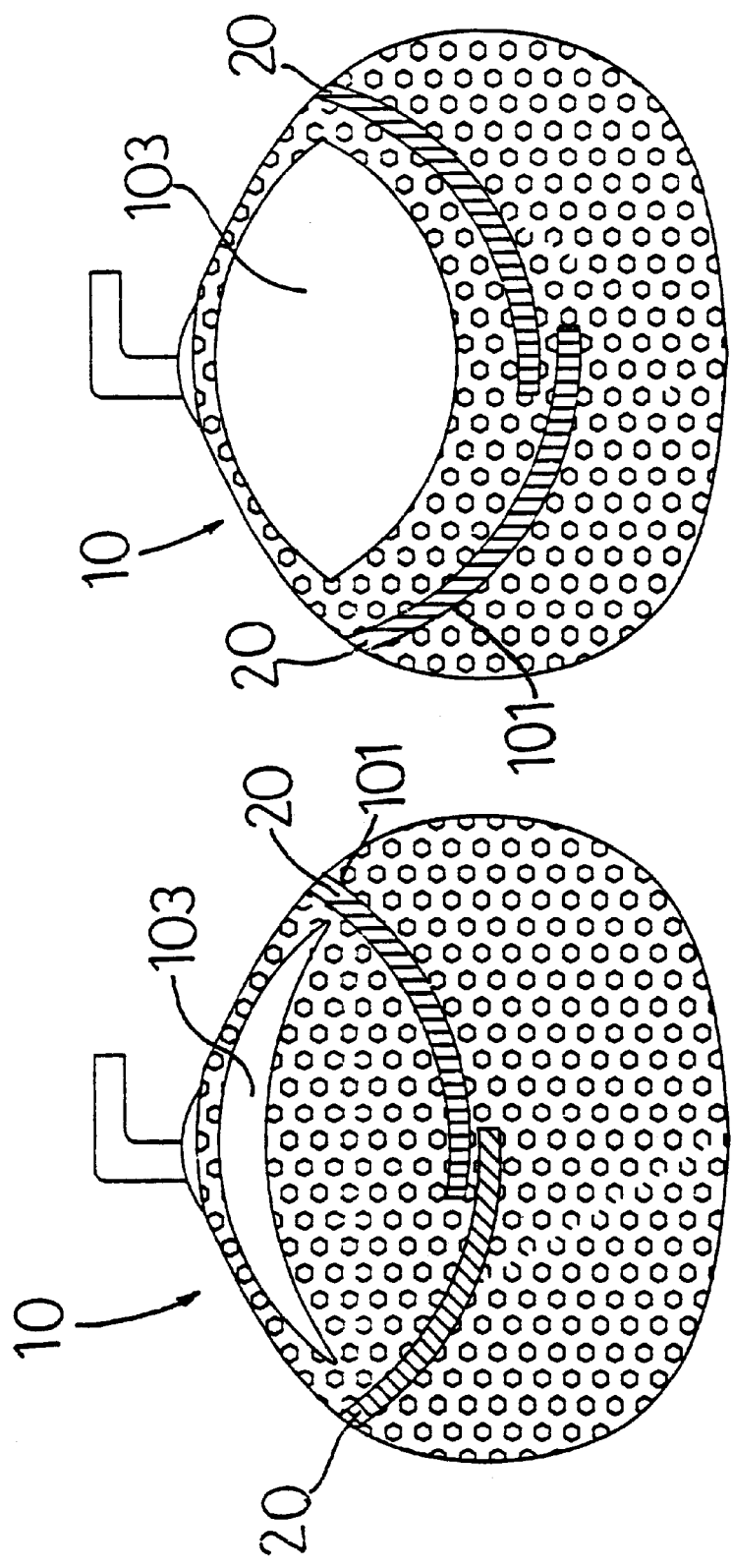
FIG. 8 shows the status before inflation and the status after inflation of an alternate form of the vehicle inner tube according to the present invention before.

FIG. 8 shows an alternate forms of the present invention. According to this embodiment, the inflatable tube 10 comprises an air chamber 103 defined on the inside, two sets of curved grooves 101 spirally arranged at its two opposite side walls around its axial center, and a plurality of side bumper members 20 respectively inserted into the grooves 101. When inflated, the side bumper members 20 are overlapped on one another to protect the air chamber 103.

Figure 9:
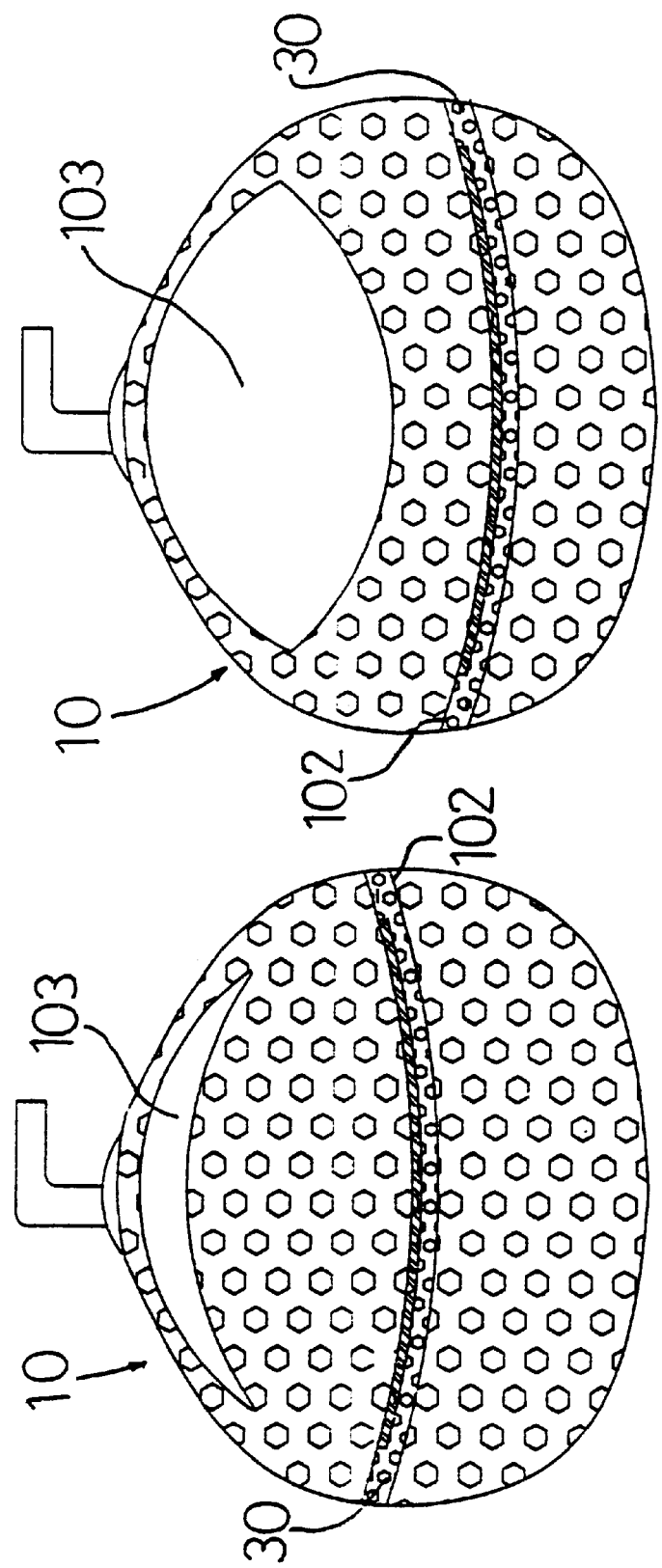
FIG. 9 shows the status before inflation and the status after inflation of another alternate form of the vehicle inner tube according to the present invention before.

FIG. 9 shows another alternate forms of the present invention. According to this embodiment, the inflatable tube 10 comprises an air chamber 103 defined on the inside, a plurality of insertion slots 102 spirally arranged around the insertion slots 101 through its two opposite side walls, and a plurality of breaker members 30 respectively inserted into the insertion slots 102 to protect the air chamber 103 against piercing of pointed objects.

It is to be understood that the drawings are designed for purposes of illustration only, and are not intended for use as a definition of the limits and scope of the invention disclosed.

What the invention claimed is:

1. A vehicle inner tube comprising:

an inflatable tube formed of a plurality of air balls, said inflatable tube comprising an air chamber defined on the inside, two sets of curved grooves spirally arranged at two opposite side walls thereof around said air chamber, and a plurality of insertion slots spirally arranged around said curved grooves through the two opposite side walls of said inflatable tube;

a plurality of breaker members respectively mounted in said insertion slots, said breaker members each comprising a flexible base pad formed of a big number of air balls, and a breaker adhered to said base pad at one side; and a plurality of side bumper members respectively mounted in said curved grooves, said side bumper members each comprising a flexible base pad formed of a big number of air balls, and a breaker adhered to said base pad at one side.

2. A vehicle inner tube comprising:

an inflatable tube formed of a plurality of air balls, said inflatable tube comprising an air chamber defined on the inside, and two sets of curved grooves spirally arranged at two opposite side walls thereof around said air chamber; and a plurality of side bumper members respectively mounted in said curved grooves, said side bumper members each comprising a flexible base pad formed of a big number of air balls, and a breaker adhered to said base pad at one side.

3. A vehicle inner tube comprising:

an inflatable tube formed of a plurality of air balls, said inflatable tube comprising an air chamber defined on the inside, and a plurality of insertion slots spirally arranged around said air chamber through the two opposite side walls of said inflatable tube; and a plurality of breaker members respectively mounted in said insertion slots, said breaker members each comprising a flexible base pad formed of a big number of air balls, and a breaker adhered to said base pad at one side.

* * * * *